United States Patent
Fukumoto et al.

(10) Patent No.: US 8,223,223 B2
(45) Date of Patent: Jul. 17, 2012

(54) IMAGE SENSING APPARATUS AND IMAGE SENSING METHOD

(75) Inventors: Shimpei Fukumoto, Osaka (JP); Haruo Hatanaka, Osaka (JP); Yasuhiro Iijima, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 221 days.

(21) Appl. No.: 12/636,052

(22) Filed: Dec. 11, 2009

(65) Prior Publication Data

US 2010/0149350 A1 Jun. 17, 2010

(30) Foreign Application Priority Data

Dec. 12, 2008 (JP) .................................. 2008-316708

(51) Int. Cl.
*H04N 5/262* (2006.01)
*H04N 5/225* (2006.01)
*H04N 5/228* (2006.01)
*H04N 5/235* (2006.01)

(52) U.S. Cl. .................. 348/239; 348/218.1; 348/208.4; 348/362

(58) Field of Classification Search ............... 348/208.1, 348/208.4, 208.6, 208.12, 208.13, 208.99, 348/218.1, 239, 362; 396/55
See application file for complete search history.

(56) References Cited

U.S. PATENT DOCUMENTS

| | | | | |
|---|---|---|---|---|
| 5,790,490 A | * | 8/1998 | Satoh et al. | 396/52 |
| 6,487,369 B1 | * | 11/2002 | Sato | 396/52 |
| 7,212,230 B2 | * | 5/2007 | Stavely | 348/208.4 |
| 7,460,773 B2 | * | 12/2008 | Ziemkowski | 348/208.99 |
| 2002/0122133 A1 | | 9/2002 | Ejima | |
| 2007/0122139 A1 | | 5/2007 | Nomura et al. | |
| 2008/0166115 A1 | * | 7/2008 | Sachs et al. | 396/55 |
| 2008/0259175 A1 | | 10/2008 | Muramatsu et al. | |
| 2008/0316334 A1 | | 12/2008 | Lee et al. | |

FOREIGN PATENT DOCUMENTS

| | | |
|---|---|---|
| JP | 2001346093 | 12/2001 |
| JP | 2002258351 | 9/2002 |
| JP | 2007150802 | 6/2007 |
| JP | 2007324770 | 12/2007 |
| WO | 2007010891 | 1/2007 |

* cited by examiner

*Primary Examiner* — Nhan T Tran
(74) *Attorney, Agent, or Firm* — NDQ&M Watchstone LLP (57) ABSTRACT

An image sensing apparatus senses first and second images, and produces a merged image by merging the first and second images together. An exposure time for the second image is longer than an exposure time for the first image. By sensing the first image before the second image, the first image is prevented from being sensed during a camera-shake-increase period starting a long time after the input of a image-sensing-start instruction. Also, by waiting for an image-sensing standby time to elapse before sensing the first image, the first image can be sensed during a period of a particularly small camera shake.

4 Claims, 7 Drawing Sheets

IMAGE SENSING APPARATUS AND IMAGE SENSING METHOD

This application is based on Japanese Patent Application No. 2008-316708 filed on Dec. 12, 2008, the contents of which are hereby incorporated by reference.

BACKGROUND OF THE INVENTION

1. Field of the Invention

The present invention relates to an image sensing apparatus that obtains an image by image sensing and applies electrical blur correction processing to the image, and an image sensing method for the image sensing apparatus.

2. Description of Related Art

Among image sensing apparatuses capable of image sensing still images exemplified by digital cameras, ones that correct motion thereof (so-called camera shake) on image sensing have been widely used. For example, some adopt optical correction processing in which an optical system such as a lens is driven to correct an optical image itself incident thereon, and others adopt electrical correction processing in which correction is applied to an image obtained by image sensing. In particular, attention is paid to those provided with electrical correction processing function, because they do not need to be provided with components such as a motion sensor and a driving system, and thus can be made compact.

An example of electrical blur correction processing is one that uses image merging. In the blur correction processing using image merging, a plurality of images are merged together to obtain an image containing less blur. In this type of blur correction processing, the amount of blur is reduced by merging an image that is sensed with a longer exposure time (hereinafter referred to as second image) and an image that is sensed with a shorter exposure time (hereinafter referred to as first image).

The second image contains blur but contains less noise. On the other hand, the first image contains less blur but contains more noise. Thus, an image containing less blur and less noise can be obtained by merging these images together.

However, there may be a case in which even the first image contains more blur. Examples of such a case include a case of a long focal length (a high optical zoom magnification) and a case in which the exposure time for even the first image as well as that for the second image needs to be long because the subject is in a dark environment. As in these cases, if even the first image contains a large amount of blur, the resultant merged image also contains a large amount of blur, and thus, inconveniently, the amount of blur cannot be sufficiently reduced.

SUMMARY OF THE INVENTION

According to one aspect of the present invention, an image sensing apparatus is provided with: an image sensing portion that obtains an image by image sensing; a merging processing portion that produces a merged image by merging together first and second images obtained by the image sensing portion; and a control portion that controls image-sensing timing of the image sensing portion. Here, the control portion controls the image sensing portion such that exposure time for the first image is shorter than exposure time for the second image, and such that the image sensing portion senses the second image after the first image.

According to another aspect of the present invention, an image sensing method is provided with: a first image production step in which a first image is obtained by image sensing; a second image production step in which a second image is obtained by image sensing; and a merging step in which a merged image is produced by merging together the first image obtained in the first image production step and the second image obtained in the second image production step. Here, an exposure time for image sensing performed in the first image production step is shorter than an exposure time for image sensing in the second image production step, and the first image production step is performed before the second image production step.

DETAILED DESCRIPTION OF PREFERRED EMBODIMENTS

Hereinafter, a description will be given of an embodiment of an image sensing apparatus and an image sensing method according to the present invention, with reference to the accompanying drawings. First, the basic structure and the basic operation of the image sensing apparatus will be described. The following description will deal with an image sensing apparatus capable of image sensing moving and still images. Noise reduction processing performed in the image sensing apparatus and in the image sensing method according to the present invention is basically applied to still images, but it may be applied to moving images, if possible.

<<Image Sensing Apparatus>>

Figure 1:
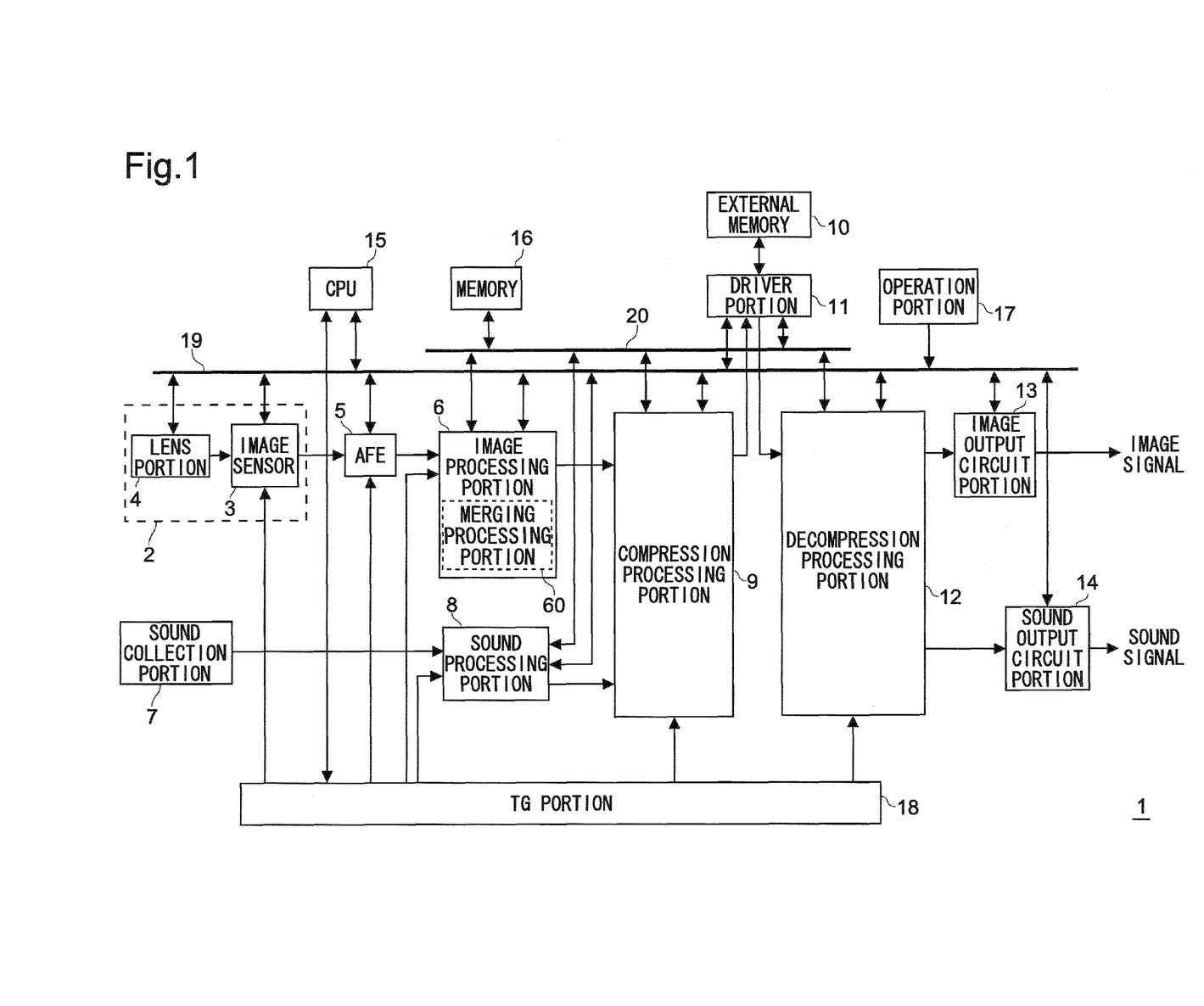
FIG. 1 is a block diagram showing the basic structure of an image sensing apparatus according to an embodiment of the present invention.

First, the basic structure of the image sensing apparatus will be described with reference to FIG. 1. FIG. 1 is a block diagram showing the basic structure of an image sensing apparatus according to an embodiment of the present invention.

As shown in FIG. 1, the image sensing apparatus 1 is provided with an image sensing portion 2 that is provided with: an image sensor 3 that is a solid-state image sensor such as a CCD (charge coupled device) image sensor or a CMOS (complementary metal-oxide semiconductor) image sensor that converts light incident thereon into an electric signal; and a lens portion 4 that focuses an optical image of a subject on the image sensor 3 and adjusts light intensity and the like.

Furthermore, the image sensing apparatus 1 is provided with: an AFE (analog front end) 5 that converts an image signal in the form of an analog signal outputted from the image sensor 3 into a digital signal; an image processing portion 6 that applies various kinds of image processing, including tone correction processing, to the image signal outputted in the form of a digital signal from the AFE 5; a sound collection portion 7 that converts sound it receives into an electric signal; a sound processing portion 8 that converts a sound signal fed thereto in the form of an analog signal from the sound collection portion 7 into a digital signal, and applies various kinds of sound processing, including noise reduction, to the sound signal; a compression processing portion 9 that applies compression/encoding processing for moving images, such as by an MPEG (Moving Picture Experts Group) compression method, to both an image signal outputted from the image processing portion 6 and a sound signal outputted from the sound processing portion 8, and that applies compression/encoding processing for still images, such as by a JPEG (Joint Photographic Experts Group) compression method, to an image signal outputted from the image processing portion 6; an external memory 10 that records a compressed/encoded signal compressed/encoded by the compression processing portion 9; a driver portion 11 that records and reads out a compressed/encoded signal compressed/encoded by the external memory 10 in and from the external memory 10; and a decompression processing portion 12 that decompresses and thereby decodes the compressed/encoded signal read out from the external memory 10 by the driver portion 11.

The image sensing apparatus 1 is also provided with: an image output circuit portion 13 that converts an image signal resulting from the decoding by the decompression processing portion 12 into an analog signal to be displayed on a display portion (not shown) such as a display; and a sound output circuit portion 14 that converts a sound signal resulting from the decoding by the decompression processing portion 12 into an analog signal to be played back through a playback portion (not shown) such as a speaker.

The image sensing apparatus 1 is further provided with: a CPU (control portion) 15 that controls the entire operation performed in the entire image sensing apparatus 1; a memory 16 that stores programs for different operations and that temporarily stores data during execution of programs; an operation portion 17 including buttons, for example, for starting image sensing and for adjusting image sensing conditions via which a user inputs an instruction; a timing generator (TG) portion 18 that outputs a timing control signal for synchronizing timings of operations of different portions; a bus line 19 across which the CPU 15 exchanges data with different portions; and a bus line 20 across which the memory 16 exchange data with different portions.

The image processing portion 6 is provided with a merging processing portion 60 that merges together a plurality of image signals fed thereto to output the resulting merged signal as one image signal. The configuration of the merging processing portion 60 will be described later in detail.

Although the image sensing apparatus 1 dealt with in the above description is capable of producing both moving-image and still-image signals, the image sensing apparatus 1 may instead be capable of producing still image signals alone. In that case, the image sensing apparatus 1 may be structured without portions such as the sound collection portion 7, the sound processing portion 8, and the sound output circuit portion 14.

The external memory 10 may be of any kind, as long as image and sound signals can be recorded therein. For example, a semiconductor memory such as an SD (secure digital) card, an optical disk such as a DVD, or a magnetic disk such as a hard disk may be used as the external memory 10. The external memory 10 may be detachable from the image sensing apparatus 1.

Next, basic operation of the image sensing apparatus 1 will be described with reference to FIG. 1. First, in the image sensing apparatus 1, an image signal in the form of an electric signal is obtained as a result of photoelectrical conversion that the image sensor 3 performs on light it receives through the lens portion 4. Then, the image sensor 3 feeds the image signal to the AFE 5 at a predetermined timing in synchronism with a timing control signal fed from the TG portion 18.

The AFE 5 converts the image signal from an analog signal into a digital signal, and feeds the resulting digital image signal to the image processing portion 6. In the image processing portion 6, the image signal, which has R (red), G (green), and B (blue) components, is converted into an image signal having components such as a luminance signal (Y) and color-difference signals (U, V), and is also subjected to various kinds of image processing, including tone correction and edge enhancement. The memory 16 operates as a frame memory that temporarily stores the image signal when the image processing portion 6 performs its processing.

Meanwhile, in the lens portion 4, positions of various lenses are adjusted to adjust focus, the degree of aperture of an aperture stop is adjusted to adjust exposure, and the sensitivity (e.g., ISO (International Organization for Standardization) sensitivity) of the image sensor 3 is adjusted according to the image signal fed to the image processing portion 6. The adjustments of focus, exposure and sensitivity are either automatically performed according to a predetermined program or manually performed according to the user's instruction to achieve optimal states of focus, exposure and sensitivity.

Also, in the image processing portion 6, a plurality of images are merged together by the merging processing portion 60. The detail of the operation of the merging processing portion 60 will be described later.

In production of an image signal of a moving image, sound is collected by the sound collection portion 7. The sound collected by the sound collection portion 7 is converted into an electric signal to be fed to the sound processing portion 8. In the sound processing portion 8, the sound signal fed thereto is converted into a digital signal and is subjected to various kinds of sound processing, including noise reduction and intensity control. Then, an image signal outputted from the image processing portion 6 and a sound signal outputted from the sound processing portion 8 are both fed to the compression processing portion 9, where the signals are compressed by a predetermined compression method. Here, the image signal and the sound signal are associated with each other in terms of time such that there is no time lag between the image and sound in playback. Then, a compressed/encoded signal compressed/encoded by and outputted from the compression processing portion 9 is recorded in the external memory 10 via the driver potion 11.

On the other hand, in production of an image signal of a still image, an image signal outputted from the image processing portion 6 is fed to the compression processing portion 9, where the image signal is compressed by a predetermined compression method. Subsequently, the compression processing portion 9 outputs a compressed/encoded signal, which is then recorded in the external memory 10 via the driver potion 11.

The compressed/encoded signal of the moving image recorded in the external memory 10 is read out by the decompression processing portion 12 based on the user's instruction. The decompression processing portion 12 decompresses and thereby decodes the compressed/encoded signal, and produces image and sound signals, and then feeds the image signal and the sound signal to the image output circuit portion 13 and the sound output circuit portion 14, respectively. In the image output circuit portion 13 and the sound output circuit portion 14, the image and sound signals are converted into formats that allow them to be played back on the display device and through the speaker, respectively, and are then outputted from the image output circuit portion 13 and the sound output circuit portion 14, respectively.

On the other hand, the compressed/encoded signal of the still image recorded in the external memory 10 is fed to the decompression processing portion 12, which produces an image signal from the compressed/encoded signal. Then, the image signal is fed to the image output circuit portion 13, where the image signal is converted into a format that can be played back on the display device.

The display device and the speaker may be integrally formed with the image sensing apparatus 1, or may instead be separate from the image sensing apparatus 1 and each connected with a cable or the like to a terminal provided in the image sensing apparatus 1.

In a so-called preview mode in which recording of an image signal is not performed and an image is displayed on a display device or the like for the user to check, the image signal outputted from the image processing portion 6 may be fed to the image output circuit portion 13 without being compressed. In recording an image signal, the image signal is compressed by the compression processing portion 9 and recorded in the external memory 10; here, the image signal may be simultaneously fed to a display device or the like via the image output circuit portion 13.

<<Merging Processing Portion>>

Next, a description will be given of an example of the merging processing portion provided in the image processing portion 6 shown in FIG. 1 with reference to relevant drawings. In the following description, of the two image signals merged together by the merging processing portion 60, one that is sensed with a longer exposure time will be referred to as "second image", and the other that is sensed with a shorter exposure time will be referred to as "first image". An image signal obtained as a result of the merging processing will be referred to as "merged image". Incidentally, for a concrete description of the example, these image signals will be described as images in the following descriptions. The configuration of the merging processing portion described below is merely an example, and thus it may be otherwise configured as long as it produces a merged image by merging the first and second images together.

Figure 2:
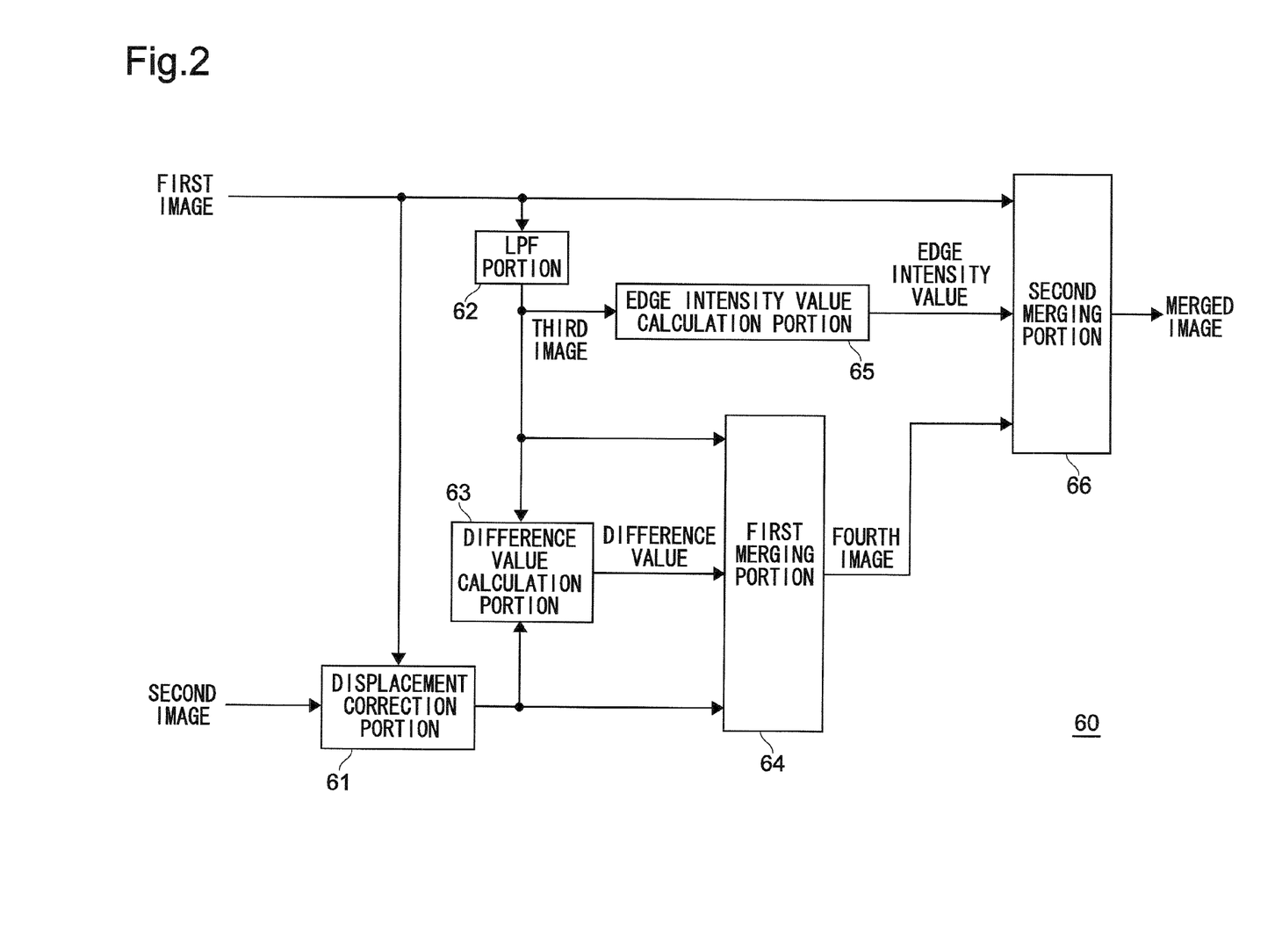
FIG. 2 is a block diagram showing an example of the configuration of a merging processing portion of an image sensing apparatus according to an embodiment of the present invention.

FIG. 2 is a block diagram showing an example of the configuration of the merging processing portion of an image sensing apparatus according to an embodiment of the present invention. As shown in FIG. 2, the merging processing portion 60 is provided with: displacement correction portion 61 that corrects displacement of the second image based on the first image; an LPF (low pass filter) portion 62 that filters out a high-frequency component having a frequency equal to or higher than a predetermined frequency from a spatial frequency of the first image to produce and output a third image; a difference value calculation portion 63 that finds difference between the second image subjected to the displacement correction and the third image, and calculates a difference value; a first merging portion 64 that merges together the second image subjected to the displacement correction by the displacement correction portion 61 and the third image based on the difference value to produce and output a fourth image; an edge intensity value calculation portion 65 that extracts an edge (such as the outline of an object) from the third image to calculate an edge intensity value; and a second merging portion 66 that merges the first and fourth images together based on the edge intensity value to produce and output a merged image.

The exposure time for the first image is preferably shorter than a camera-shake-limit exposure time (1/f sec where the focal length is "f" mm, a time period during which hardly any camera shake occurs, "1" being a value in terms of 35 mm film cameras). The exposure time for the second image should at least be longer than the exposure time for the first image. For example, the second image may be sensed with a correct exposure time (an exposure time leading to correct brightness of an image produced at the image sensing portion 2). The correct exposure time may be automatically set based on values such as the focal length, the aperture value or the sensitivity, and the exposure value (indicating the brightness of the subject) to satisfy a predetermined relationship.

Next, operation of the merging processing portion 60 will be described with reference to FIG. 2. First, as shown in FIG. 2, the first and second images obtained through image sensing by the image sensing portion 2 are fed to the merging processing portion 60. As described above, the second image is an image sensed with an exposure time that is longer than a exposure time for the first image. The sensitivity of the image sensor 3 is set lower when the second image is sensed than when the first image is sensed. Furthermore, the exposure time and the sensitivity are so set as to adjust the first and second images to be substantially equal in brightness.

The timings with which the first and second images are sensed are controlled by the CPU 15. The detail of the image-sensing timings for the first and second images will be described later.

The first image, sensed with shorter exposure time, contains less blur due to camera shake, and thus has sharp edges. However, since the sensitivity of the image sensor 3 is set high, the first image is likely to contain much noise.

In comparison, the second image is sensed with longer exposure time and lower sensitivity of the image sensor 3, and thus contains less noise than the first image. However, since the exposure time is set long, the second image is likely to contain blur due to camera shake, and thus is likely to have blurred edges.

The first and second images are basically consecutively sensed and produced, and compositions of the first and second images are substantially equal. However, since the first and second images are not sensed perfectly simultaneously, there may be slight displacement between their compositions. Thus, the displacement correction portion 61 is provided to correct such displacement between the compositions of the first and second images.

The displacement correction portion 61 detects "displacement" by, for example, searching for a part at which the first and second images are substantially equal. Then, according to the thus found "displacement", coordinates of pixels in the second image are converted, and thereby correction is performed such that coordinates of a pixel in the first image and those of a pixel in the second image are substantially equal when the pixels indicate the same object. That is, processing is performed to specify pixel-to-pixel correspondence between the first and second images.

Figure 3:
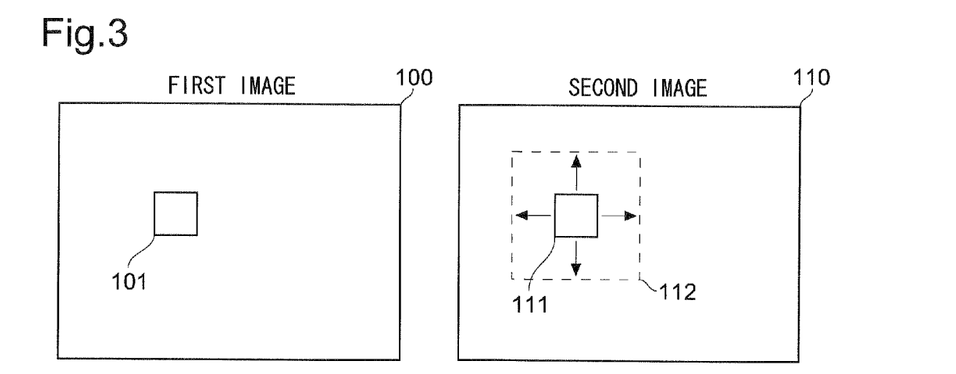
FIG. 3 is a schematic diagram for illustrating a block matching method.

Examples of the method of searching for a part at which the first and second images are substantially equal include various methods of finding an optical flow and a representative point matching method. Here, as an example of the method of such searching, description will be given of a case in which is adopted a block matching method, which is a method of finding an optical flow, with reference to FIG. 3. FIG. 3 is a schematic diagram for illustrating a block matching method.

In the left drawing of FIG. 3, reference numeral 100 denotes the first image and reference numeral 101 denotes an attention-focused block on which attention is focused in the first image. In the right drawing of FIG. 3, reference numeral 110 denotes the second image and reference numeral 111 denotes a candidate block in the second image on which attention is focused. Reference numeral 112 denotes a search block in which the candidate block 111 can be located.

The displacement correction portion 61 calculates a correlation value between the attention-focused block 101 and the candidate block 111. Here, the candidate block 111 is moved within the search block 112 by one pixel at a time in the horizontal or the vertical direction, and a correlation value is calculated each time the candidate block 111 is moved. The correlation value may be, for example, a sum of all the absolute values of differences in brightness between pairs of corresponding pixels in the attention-focused block 101 and the candidate block 111. Such a correlation value is generally called SAD (sum of absolute difference). Or, instead, a sum of squared values of such differences in brightness may be used as the correlation value.

The higher the correlation between an image in the attention-focused block 101 and an image in the candidate block 111 is, the smaller the correlation value is. Thus, by finding the location of the candidate block 111 at which the correlation value is the smallest, there can be found not only the location of a block in the second image that shows an image substantially equal to the image that is shown by the attention-focused block 101, but also motion vectors of the attention-focused block 101 between the first and second images (i.e., an optical flow, indicating the direction and magnitude of displacement between the first and second images). Based on the thus obtained motion vectors, the "displacement" can be found.

In addition, LPF portion 62 produces the third image by applying LPF processing to the first image. The LPF portion 62 filters out high-spatial-frequency part of the first image (that is, perform noise reduction). A cutoff frequency of the LPF portion 62 is set to such a value that does not cause edges to be extremely blurred along with noise reduction (specifically, to such a value that edges can be sharply extracted by the edge intensity value calculation portion 65, which will be described later).

And the difference value calculation portion 63 performs difference processing between the second and third images, and calculates a difference value. The difference value is a value indicating difference in color or brightness between corresponding pixels in the two images, and the difference value between pixels(x, y) is described as a difference value D(x, y). For example, the difference value D(x, y) can be obtained by using formula (1) below. Note that "x" indicates the location (coordinate) of a pixel in the horizontal direction in an image, and "y" indicates the location (coordinate) of the pixel in the vertical direction in the image.

$$D(x,y) = |P2(x,y) - P3(x,y)| \qquad (1)$$

In formula (1), P2(x, y) indicates a signal value of the pixel(x, y) in the second image, P3(x, y) indicates a signal value of the pixel(x, y) in the third image, and D(x, y) indicates a difference value obtained, as described above, from these signal values.

Specifically, for example, the difference value D(x, y) may be calculated according to formula (1a) below. Formula (1a) deals with a case in which RGB values are used as the signal values P2(x, y) and P3(x, y) of the pixels (x, y) in formula (1). In formula (1a), the values of the R, G, and B components of the signal value of the pixel (x, y) in the second image are represented by $P2_R(x, y)$, $P2_G(x, y)$, and $P2_B(x, y)$, respectively; and the values of the R, G, and B components of the signal value of the pixel(x, y) in the third image are represented by $P3_R(x, y)$, $P3_G(x, y)$, and $P3_B(x, y)$, respectively. According to the calculation method shown by formula (1a), the difference value D(x, y) is obtained by separately calculating absolute values of the differences of the R, G, and B components and adding up the separately calculated absolute values.

$$D(x, y) = |P2_R(x, y) - P3_R(x, y)| + \\ |P2_G(x, y) - P3_G(x, y)| + |P2_B(x, y) - P3_B(x, y)| \qquad (1a)$$

Or, instead, for example, the difference value D(x, y) may be calculated according to formula (1b) below. Formula (1b), too, deals with the case where the RGB values are used, and the values of the components of the signal values are indicated in the same manner as in formula (1a). According to formula (1b), the difference value D(x, y) is obtained by squaring the difference of each of the R, G, and B components, adding up the results to a sum, and raising the sum to the one-half power.

$$D(x, y) = \left[ \begin{array}{l} \{P2_R(x, y) - P3_R(x, y)\}^2 + \\ \{P2_G(x, y) - P3_G(x, y)\}^2 + \\ \{P2_B(x, y) - P3_B(x, y)\}^2 \end{array} \right]^{\frac{1}{2}} \qquad (1b)$$

The above methods shown by formulae (1), (1a), and (1b) are merely examples, and the difference value D(x, y) may be calculated by using other methods. Furthermore, the difference value D(x, y) may be calculated by using YUV values instead of the RGB values in the method in which the RGB values are used (that is, by substituting the YUV values for the RGB values). Moreover, the difference value D(x, y) may be calculated based merely on values of the Y components of the signal values of the second and third images.

Figure 4:
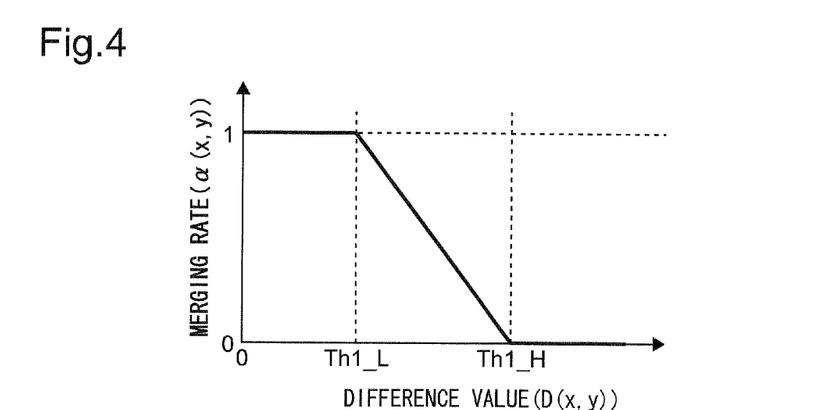
FIG. 4 is a graph showing an example of how merging is performed by a first merging portion.

The first merging portion 64 merges the second and third images together to produce a fourth image. For example, weighted addition of the second and third images is performed to merge the images together. An example of the case where the merging by weighted addition is performed will be described with reference to FIG. 4. FIG. 4 is a graph showing an example of how merging is performed by the first merging portion 64.

As shown in FIG. 4, with the method of this example, a mixing ratio α(x, y) is set based on the difference value D(x, y), and according to the mixing ratio α(x, y), weighted addition is performed. Specifically, the second and third images are merged together according to the following formula (2).

$$P4(x,y) = \alpha(x,y) \times P2(x,y) + \{1 - \alpha(x,y)\} \times P3(x,y) \qquad (2)$$

The mixing ratio α(x, y) indicates an addition ratio (a merging ratio) that is used in performing weighted addition of the signal value P2(x, y) of a pixel at a position (x, y) in the second image and the signal value P3(x, y) of a pixel at a position (x, y) in the third image. The mixing ratio α(x, y) is the addition ratio for the second image, and thus the addition ratio for the third image is "1−α(x, y)."

The mixing ratio α(x, y) is "1" when the difference value D(x, y) is smaller than a threshold value Th1_L, and "0" when the difference value D(x, y) is equal to or larger than a threshold value Th1_H. The mixing ratio α(x, y) is "1−(D(x, y)−Th1_L/(Th1_H−Th1_L)" when the difference value D(x, y) is equal to or larger than the threshold value Th1_L and smaller than the threshold value Th1_H. That is, as the difference value D(x, y) is increased from the threshold value Th1_L to the threshold value Th1_H, the mixing ratio α(x, y) is linearly reduced from 1 to 0. Incidentally, although the mixing ratio α(x, y) may be non-linearly reduced, it is preferable that the mixing ratio α(x, y) be monotonously reduced.

And, by performing the weighted addition shown by formula (2) described above, a signal value P4(x, y) of a pixel at a position (x, y) in the fourth image is obtained. When the signal values P2(x, y) and P3(x, y) of the pixels in the second and third images each include YUV values, calculation may be separately performed for each of the Y, U, and V components to obtain the signal value P4(x, y) of the pixel in the fourth image. Or, instead of signal values including YUV values, signal values including RGB values may be used.

The edge intensity value calculation portion 65 applies edge extraction processing to the third image, and calculates an edge intensity value. The edge intensity value is a value that indicates an amount of variation of a pixel (the amount of variation relative to ambient pixels). Here, the edge intensity value at a pixel(x, y) is indicated by E(x, y). For example, the edge intensity value E(x, y) at the pixel(x, y) can be obtained by using formula (3) described below.

$$E(x, y) = \left| \sum_{i=-1}^{1} \sum_{j=-1}^{1} Fx(i, j) \cdot P3_Y(x+i, y+j) \right| + \left| \sum_{i=-1}^{1} \sum_{j=-1}^{1} Fy(i, j) \cdot P3_Y(x+i, y+j) \right| \quad (3)$$

In formula (3), $P3_Y(x, y)$ indicates the Y component value of the signal value of the pixel(x, y) in the third image. When RGB values are included in the signal value of a pixel, a value corresponding to the Y component may be calculated by using the RGB components, and the value may be used as the Y component value.

Fx(i, j) and Fy(i, j) each indicate a filter that extracts edges, that is to say, a filter that enhances edges in an image. As such a filter, for example, a differential filter such as a Sobel and a Prewitt filter can be used. Also, formula (3) described above deals with, as an example, a case in which a 3×3 filter is employed. Fx(i, j) is a filter that extracts edges in the x direction (horizontal direction) and Fy(i, j) is a filter that extracts edges in the y direction (vertical direction).

In the case in which a Prewitt filter is used as a filter for extracting edges, Fx(i, j) may be such that Fx(−1, −1)=Fx(−1, 0)=Fx(−1, 1)=−1, Fx(0, −1)=Fx(0, 0)=Fx(0, 1)=1, and Fx(1, −1)=Fx(1, 0)=Fx(1, 1)=1. Fy(i, j) may be such that Fy(−1, −1)=Fy(0, −1)=Fy(1, −1)=−1, Fy(−1, 0)=Fy(0, 0)=Fy(1, 0)=0, and Fy(−1, 1)=Fy(0, 1)=Fy(1, 1)=1.

The edge intensity value E(x, y) of the pixel(x, y) as shown by formula (3) can be obtained by adding up the absolute values of the following values: a value obtained by multiplying the Y component values of pixels in the 3-by-3 region around the pixel(x, y) each by a value of a corresponding element of the 3-by-3 filter Fx(i, j), and then adding up resulting products; and a value obtained by multiplying the Y component values pixels in the 3-by-3 region around the pixel (x, y) each by a value of a corresponding element of the 3-by-3 filter Fy(i, j), and then adding up resulting products. The method shown in formula (3) is just an example, and thus the edge intensity value E(x, y) may be obtained by using other methods.

Figure 5:
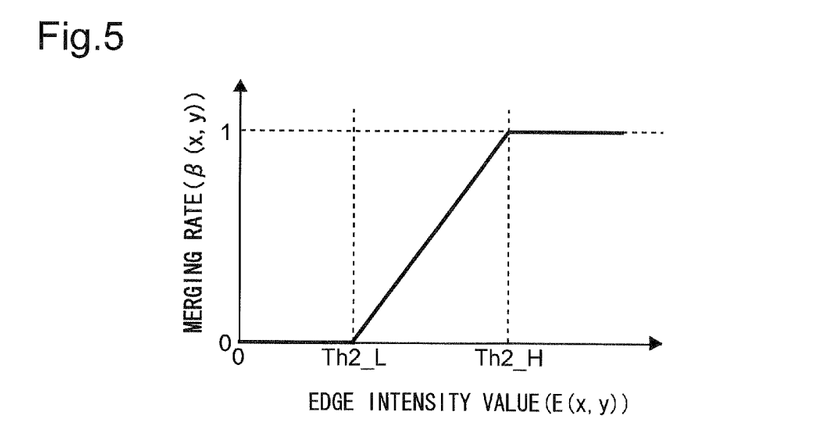
FIG. 5 is a graph showing an example of how merging is performed by a second merging portion.

And finally, the second merging portion 66 merges the first and fourth images together to produce a merged image. This merging is performed, for example, by performing weighted addition of the first and fourth images. An example of the case in which merging is performed by weighted addition will be described with reference to FIG. 5. FIG. 5 is a graph showing an example of how merging is performed by the second merging portion.

As shown in FIG. 5, with the method of this example, a mixing ratio β(x, y) is set based on the edge intensity value E(x, y), and weighted addition is performed according to the mixing ratio β(x, y). Specifically, the first and fourth images are merged together according to the following formula (4).

$$P(x,y) = \beta(x,y) \times P1(x,y) + \{1 - \beta(x,y)\} \times P4(x,y) \quad (4)$$

The mixing ratio β(x, y) indicates an addition ratio (a merging ratio) that is used in performing weighted addition of the signal value P1(x, y) of a pixel at a position (x, y) in the first image and the signal value P4(x, y) of a pixel at a position (x, y) in the fourth image. The mixing ratio β(x, y) is the addition ratio for the first image, and thus the addition ratio for the fourth image is "1−β(x, y)."

The mixing ratio β(x, y) is "0" when the edge intensity value E(x, y) is smaller than a threshold value Th2_L, and "1" when the edge intensity value E(x, y) is equal to or larger than a threshold value Th2_H. The mixing ratio β(x, y) is (E(x, y)−Th2_L)/(Th2_H−Th2_L) when the edge intensity value E(x, y) is equal to or larger than the threshold value Th2_L and smaller than the threshold value Th2_H. That is, as the edge intensity value E(x, y) is increased from the threshold value Th2_L to the Th2_H, the mixing ratio β(x, y) is linearly increased from 0 to 1. Although the mixing ratio β(x, y) may be non-linearly increased, it is preferable that the mixing ratio β(x, y) be increased monotonously.

Through the weighted addition shown in formula (4) described above, a signal value P(x, y) of a pixel at a position (x, y) in a merged image is obtained. When the values of the YUV components are included in the signal values P2(x, y) and P3(x, y) of the pixels in the second and third images, calculation may be separately performed for each of the YUV components to obtain the signal value P(x, y) of the pixel in the merged image. Or, instead of the signal values of the YUV components, those of the RGB components may be used.

Above-described configuration of the merging processing portion 60 makes it possible to obtain a merged image where the advantages of the first and second images, that is, sharp edges and reduced noise, respectively, are effectively merged together.

Specifically, since the merging of the second and third images is performed by using a difference value obtained from the second and third images, it is possible to prevent subject motion blur (blur caused by the subject moving during the exposure time) from the second image and noise from the first image from being reflected in the fourth image. Also, since the merging of the first and fourth images is performed by using an edge intensity value obtained from the third image, the sharpness of the edges of the first image containing less blur can be effectively reflected in the merged image, and also, noise from the first image can be prevented from being reflected in the merged image. Thus, the merged image can be obtained as an image that has sharp edges, containing less blur due to camera shake or due to subject motion, and that contains less noise.

Also, since the third image produced by applying LPF processing to the first image is used for calculating the edge intensity value, it is possible to prevent noise in the first image from causing the edge intensity value E(x, y) to be large in parts other than edges.

The configuration of the merging processing portion 60 is merely an example, and thus the merging processing portion 60 may be otherwise configured. For example, the merging processing portion 60 may be configured such that no intermediate images such as the third and fourth images (that is, images produces by converting, for example, the first and second images) are produced, but the first and second images are directly merged together.

<<Example of Image Sensing Apparatus Control>>

Figure 6:
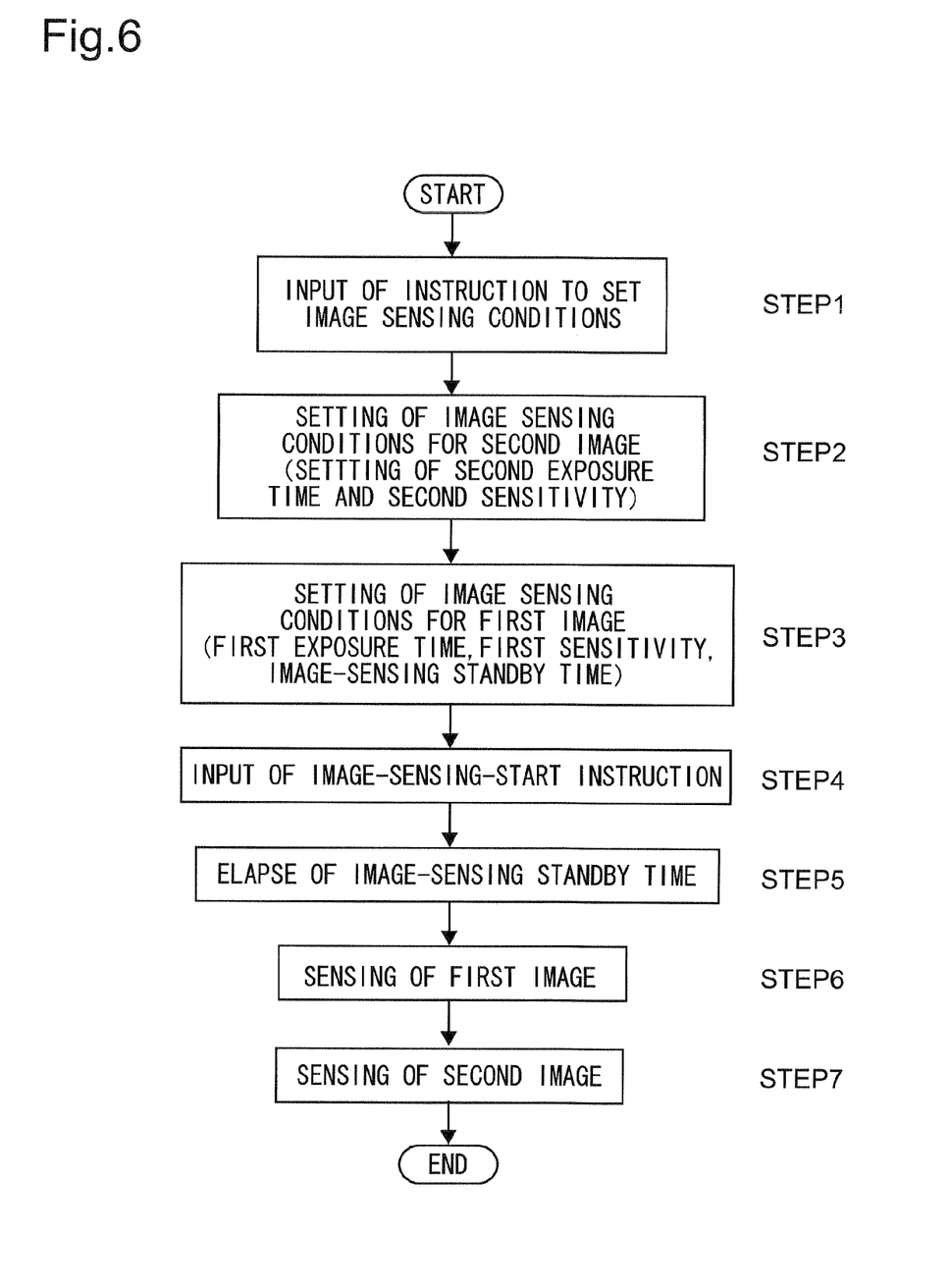
FIG. 6 is a flow chart showing an example of the operation of an image sensing apparatus according to an embodiment of the present invention.

Next, a description will be given of an example of the operation of the image sensing apparatus 1 in sensing the first and second images, that is, an example of how the image sensing apparatus 1 is controlled by the CPU 15. FIG. 6 is a flow chart showing an example of the operation of an image sensing apparatus according to an embodiment of the present invention.

As shown in FIG. 6, the first and second images are sensed, a user inputs an instruction to set image sensing conditions (STEP 1). The instruction is inputted to the image sensing apparatus 1 by, for example, half-pressing a shutter release button which is part of the operation portion 17 as shown in FIG. 1. At this time, a preview may be performed in which an image inputted and stored in the image sensing apparatus 1 is displayed on a display portion or the like. In that case, the user can check the composition of an image to be produced by viewing the image displayed on the display portion, and according to the check result, the user inputs an instruction to set the image sensing conditions to the image sensing apparatus 1.

When the instruction to set the image sensing conditions is inputted, image sensing conditions for the second image are set based on the image inputted in the image sensing apparatus 1 (STEP 2). For example, image sensing conditions such as focus, exposure, and white balance are controlled by the image processing portion 6 checking the image as described above. At this time, based on the focus, the exposure value, etc., second sensitivity is set as the sensitivity for the second image and a second exposure time is set as the exposure time for the second image. Incidentally, the second exposure time may be the correct exposure time as described above.

Next, the image sensing conditions for the first image are set based on the image sensing conditions for the second image that is set in STEP 2 (STEP 3). Here, as image sensing conditions for the first image, a first exposure time is set as the exposure time for the first image, and first sensitivity is set as the sensitivity for the first image. The first exposure time is set shorter than the second exposure time, to thereby prevent the first image from containing blur. The first sensitivity is set higher than the second sensitivity, to thereby make the first and second images substantially equal in brightness. For example, if the first exposure time is set to ¼ of the second exposure time, the first sensitivity is set four times as high as the second sensitivity. That is, the exposure time and the sensitivity are set such that the product of the exposure time and the sensitivity is constant.

Furthermore, the time from the input of an instruction to start image sensing until the start of the sensing of the first image (hereinafter, referred to as "image-sensing standby time") is also set in STEP 3. Detail of the image-sensing standby time will be described later.

After the image sensing conditions for the first image is set in STEP 3, the user inputs an instruction to start image sensing (hereinafter, referred to as "image-sensing-start instruction") (STEP 4). The image-sensing-start instruction is inputted to the image sensing apparatus 1 by, for example, fully pressing the shutter release button, which is part of the operation portion 17 as shown in FIG. 1, The image sensing apparatus 1 senses the first image and the second image in this order. Here, the image sensing apparatus 1 waits for the image-sensing standby time to elapse after the image-sensing-start instruction is inputted in STEP 4 (STEP 5), and then starts sensing the first image (STEP 6). Then, after the image sensing of the first image, the image sensing apparatus 1 consecutively senses the second image (STEP 7), and then finishes the image sensing.

(Image-Sensing Standby Time)

Figure 7:
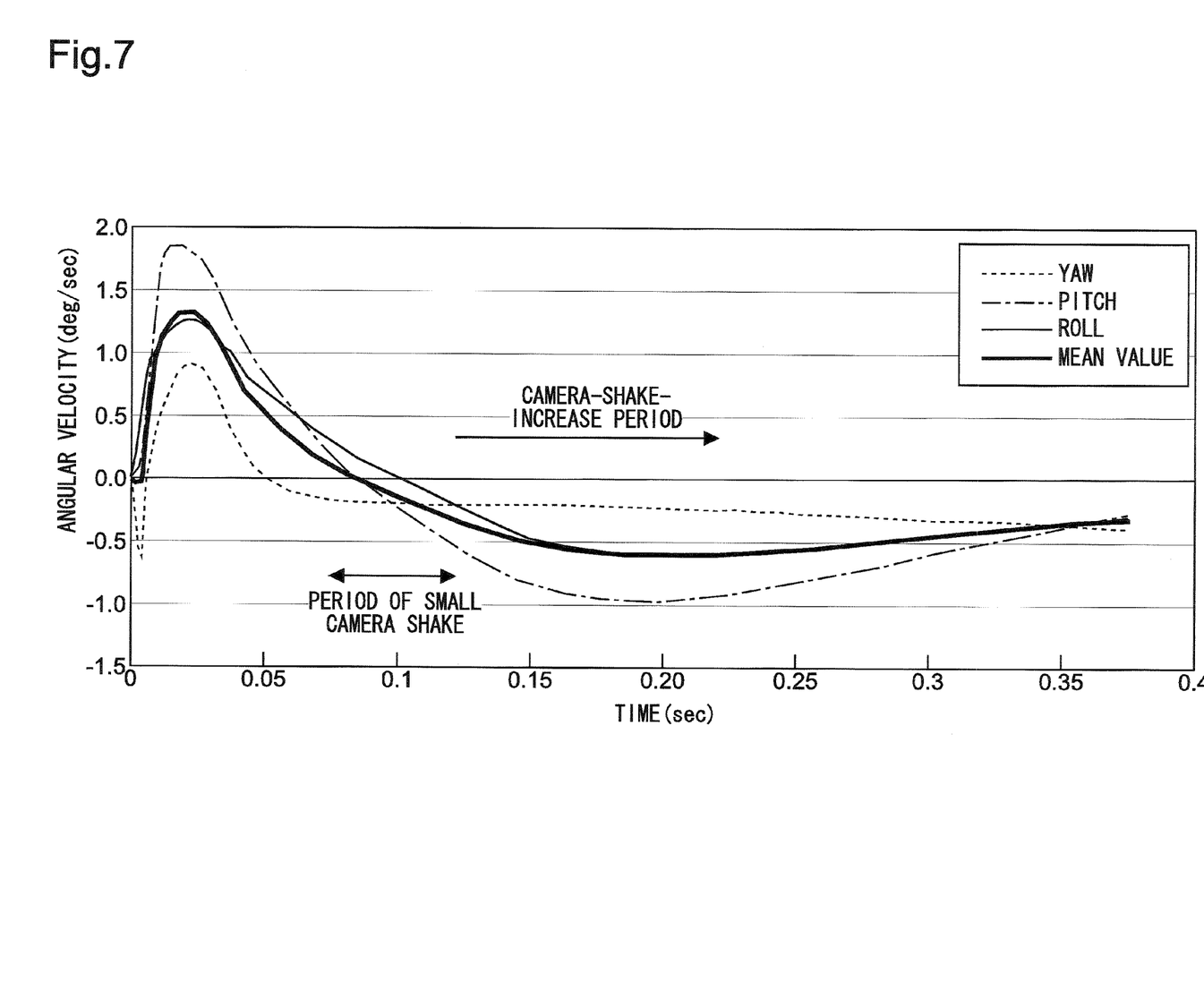
FIG. 7 is a graph showing an example of how camera shake of an image sensing apparatus occurs after an image-sensing-start instruction is inputted.

The image-sensing standby time in STEP 5 will be described with reference to FIG. 7. FIG. 7 is a graph showing an example of how camera shake of an image sensing apparatus occurs after an image-sensing-start instruction is inputted. The graph of FIG. 7 illustrates experimentally obtained temporal variation of the camera shake occurring when the user uses a certain image sensing apparatus 1. Hereinafter, the camera shake occurrence pattern unique to the certain image sensing apparatus 1 shown in this graph will also be referred to as "camera shake pattern."

In the graph of FIG. 7, the point 0 along the axis that indicates time is the time point when the image-sensing-start instruction is inputted. The amount of camera shake is expressed in terms of angular velocity. The angular velocity in the yaw direction is indicated by a broken line, the angular velocity in the pitch direction is indicated by a dash-dot line, the angular velocity in the roll direction is indicated by a thin line, and the mean value of the angular velocities is indicated by a thick line.

Figure 8:
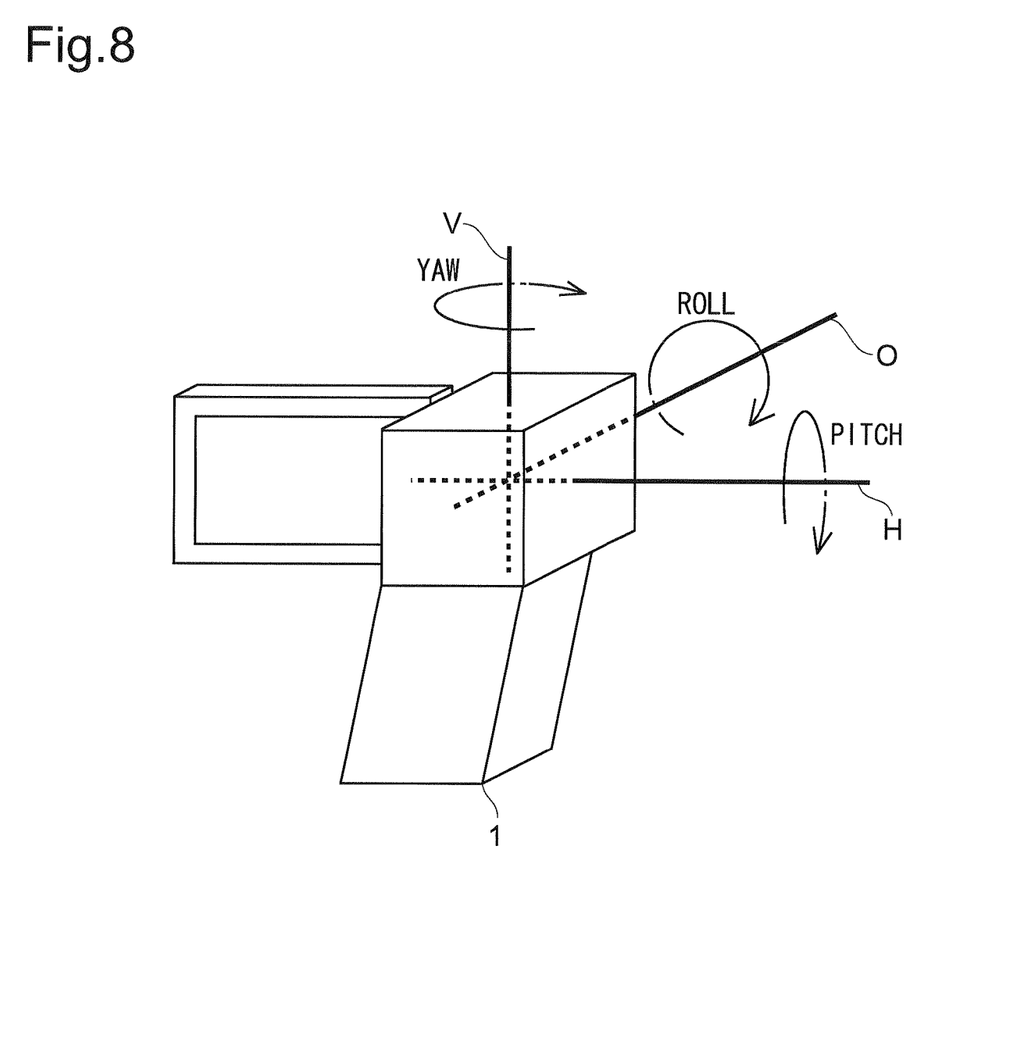
FIG. 8 is a perspective view of an image sensing apparatus illustrating yaw, pitch, and roll directions.

The yaw, pitch, and roll directions will be described with reference to FIG. 8. FIG. 8 is a perspective view of the image sensing apparatus illustrating the yaw, pitch, and roll directions. In FIG. 8, an optical axis O is substantially parallel to the horizontal plane, a vertical axis V is substantially perpendicular to the horizontal plane, and a horizontal axis H is substantially perpendicular to the optical axis O and the vertical axis V. The yaw direction is a direction of rotation around the vertical axis V, the pitch direction is a direction of rotation around the horizontal axis H, and the roll direction is a direction of rotation around the optical axis O. Of each of these directions, the direction (indicated by an arrow in the figure) that is clockwise with respect to the image sensing apparatus 1 is the forward direction.

As shown in FIG. 7, camera shake is large in all the three directions immediately after the image-sensing-start instruction is inputted. Such camera shake occurs (for example, during the period from 0 to 0.08 seconds after the input of the instruction) when the whole image sensing apparatus 1 is moved due to, for example, the shutter release button being fully pressed by the user in order to input the image-sensing-start instruction. The camera shake gradually becomes larger with time (for example, during a period starting at 0.13 seconds after the input of the instruction: hereinafter, referred to as "camera-shake-increase period") due to causes such as a reaction occurring when the user takes his/her finger off the shutter release button and gradual reduction of the user's tension with which the user holds the image sensing apparatus 1.

The image sensing apparatus 1 according to an embodiment of the present invention senses the first image before sensing the second image that is to be sensed with a longer exposure time. Thus, the first image is sensed before the camera-shake-increase period starts.

It is further preferable that the image sensing apparatus 1 having the tendency of camera shake shown in FIG. 7 sense the first image during a period before the camera-shake-increase period in which overall camera shake is smaller (for example, the absolute value of the mean value of camera shake is 0.5 or less during the period between 0.08 and 0.13 seconds after the input of the image-sensing-start instruction). Thus, in the case shown in FIG. 7, the image-sensing standby time is set to approximately 0.8 seconds. If the user wants to reduce camera shake in a particular direction, he/she may set the image-sensing standby time according to a period during which camera shake is small in the direction. For example, in the case shown in FIG. 7, if the user wants to reduce to the minimum the amount of blur due to camera shake in the roll direction, which is particularly difficult to correct, it is preferable that the image-sensing standby time be set to approximately 0.1 seconds.

The second image starts to be sensed immediately after the first image is sensed. More specifically, sensing of the second image starts when the image sensing portion 2 has finished sensing the first image and is ready for the next image sensing. In this way, the image-sensing standby time can be reduced to the minimum, to thereby reduce the amounts of blur in the first and second images.

With the above configuration, the image sensing of the first image with a shorter exposure time is performed before the image sensing of the second image with a longer exposure time. This helps securely prevent the image sensing of the first image from being performed during the camera-shake-increase period. As a result, the amount of blur in the first image can be reduced, and thus the amount of blur in the merged image can be effectively reduced.

Furthermore, the provision of the image-sensing standby time makes it possible for the image sensing of the first image to be performed during a period when the amount of camera shake is particularly small (for example, in the period between 0.08 and 0.13 seconds in FIG. 7). As a result, the first image can be prevented from containing blur, and thus the amount of blur in the merged image can be reduced more effectively.

Moreover, since the image-sensing standby time is set based on the tendency of camera shake attributable to the structural features of the image sensing apparatus such as the shape and the weight of the image sensing apparatus, there is no need of providing the image sensing apparatus with a sensor (for example, an angular velocity sensor) for detecting camera shake. This allows the image sensing apparatus to be compact. This also allows the image sensing apparatus to be less costly.

The tendency of camera shake shown in FIG. 7 is merely an example. The tendency of camera shake differs depending on structural features of the image sensing apparatus such as the shape (that is, the shape of the portion that the user holds, the arrangement of the shutter release button, the position of the lens (optical axis)) and the weight of the image sensing apparatus. Thus, it is preferable that tendency of camera shake be experimentally found beforehand (for example, before shipping) with respect to each model of the image sensing apparatus to set the image-sensing standby time with respect to each model of the image sensing apparatus.

Figure 9A:
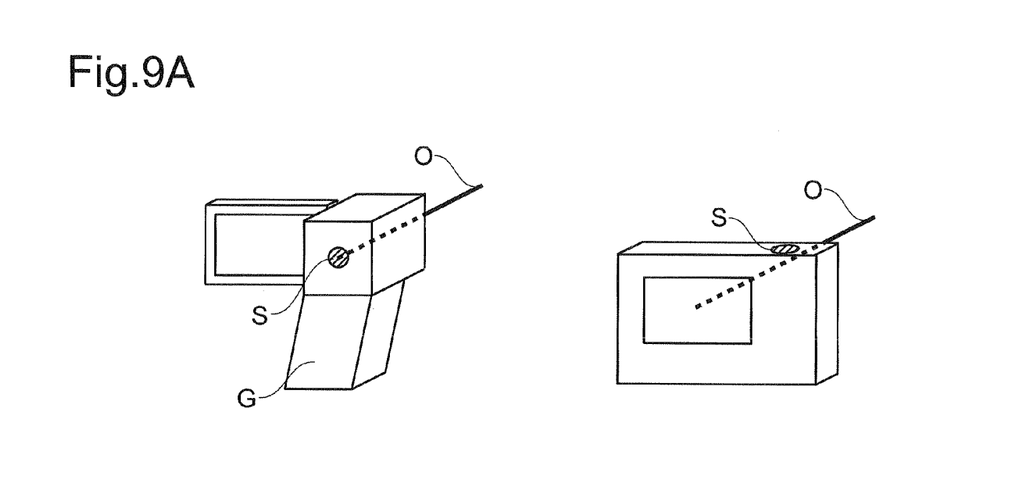
FIG. 9A shows different types of the image sensing apparatuses.
Figure 9B:
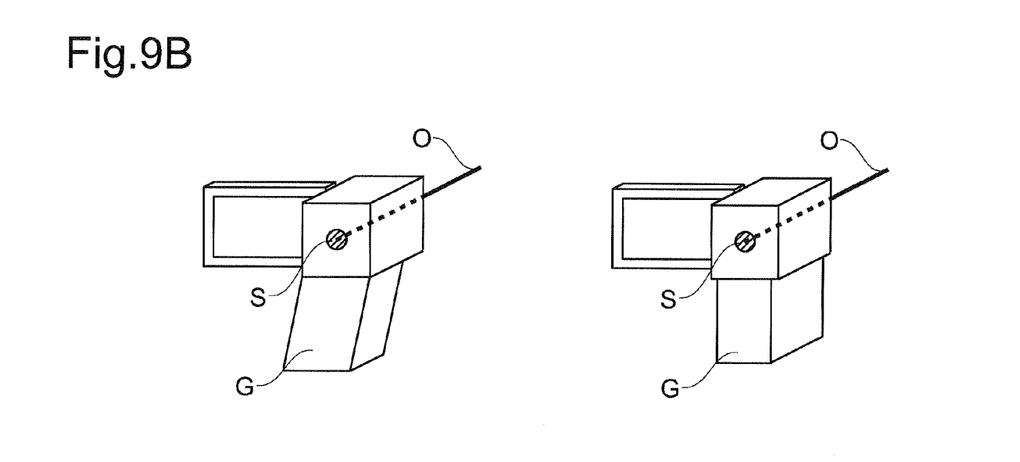
FIG. 9B shows different shapes for a grip portion of a vertical-type image sensing apparatus.
Figure 9C:
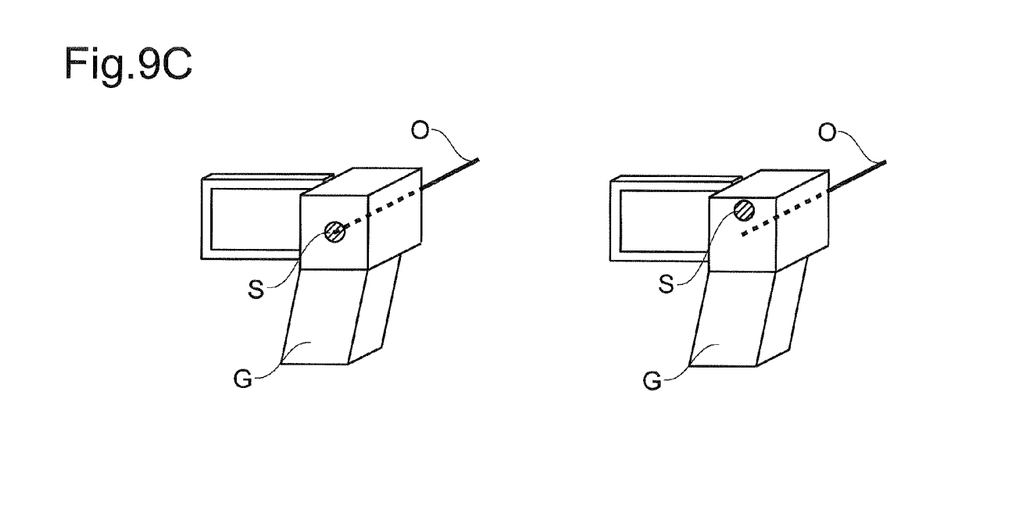
FIG. 9C shows different arrangements of a shutter button of a vertical-type image sensing apparatus.

Typical variations of the shape of the image sensing apparatus are shown in FIGS. 9A to 9C. FIG. 9A shows different types of the image sensing apparatus. The left one provided with a grip portion G to be held by one hand is a vertical type image sensing apparatus, and the right one whose whole body is held by two hands is a lateral type image sensing apparatus. FIG. 9B shows different shapes of the grip portion G of the vertical type image sensing apparatus. The grip portion G of the left image sensing apparatus protrudes in a direction substantially perpendicular to the image sensing direction, and the protruding grip portion G is inclined in a direction opposite to the image sensing direction such that the grip portion G is further away from the image sensing direction. On the other hand, the grip portion G of the right image sensing apparatus just protrudes in a direction perpendicular to the image sensing direction. FIG. 9C shows different positions of the shutter release button of the vertical type image sensing apparatus. The shutter release button S of the left image sensing apparatus is provided on the optical axis O. On the other hand, the shutter release button S of the right image sensing apparatus is provided at a position off the optical axis (specifically, above the optical axis O).

For example, such differences in the image sensing apparatuses as described above lead to different tendencies of camera shake. Specifically, with different image sensing apparatuses, large camera shake occurs in different directions and during different periods.

If a set first exposure time is extremely shorter than a predetermined standard exposure time (for example, the camera shake limit exposure time), that is, if the relation "the first exposure time≦the standard exposure time×k (where k<1)" is satisfied, it may be judged that the first image is less likely to contain blur. Here, the image-sensing standby time may be set to 0.

With this configuration, if the first image can be expected to contain only a small amount of blur, the sensing of the first image can be performed as soon as possible. This makes it possible to prevent the usability of the image sensing apparatus from becoming so degraded that the user misses a photo opportunity, the composition of an obtained image is displaced from a desired composition, or the user suspects that the image-sensing-start instruction has not been correctly inputted.

Also, depending on the performance and the tendency of camera shake of the image sensing apparatus, despite the first image being intended to be sensed immediately after the input of the image-sensing-start instruction, there may be a case in which the period of minor camera shake comes to an end before the sensing of the first image is started; that is, for example, a case in which it takes a long time to get the image sensing of the first image started, and a case in which a period of minor camera shake starts immediately after the input of the image-sensing-start instruction. In these cases, as in the case described above, the image-sensing standby time may be set to 0. That is, the image sensing of the first image may be started at the time point when the image sensing of the first image becomes ready to be started. Or instead, the image-sensing standby time may be set such that the first image is sensed during a period of small camera shake that exists after the time at which the image sensing apparatus becomes ready to sense the first image.

A limit value may be provided for the image-sensing standby time. This helps prevent the image sensing of the first image from starting too late. This helps prevent deterioration of the operability of the image sensing apparatus.

The image-sensing standby time may also be provided between the sensing of the first and second images. However, in view of, for example, preventing the time between the input of the image-sensing-start instruction and the end of the image sensing from becoming too long, and in view of making the displacement between the first and second images small, it is preferable that the time between the sensing of the first image and the sensing of the second image be short.

The user may be allowed to change the image-sensing standby time. More specifically, the image-sensing standby time may be set according not only to a tendency of camera shake attributable to the structural features of the image sensing apparatus, but also to a tendency of camera shake attributable to the user.

Modified Example

In an image sensing apparatus 1 according to an embodiment of the present invention, portions such as an image processing portion 6 and a merging processing portion 60 may each be operated by a control device such as a microcomputer. Furthermore, all or part of the functions realized by such a control device may be prepared in the form of a computer program so that those functions—all or part—are realized as the computer program is executed on a program execution apparatus (for example, a computer).

In addition to the above-described case, the image sensing apparatus 1 shown in FIG. 1 and the merging processing portion 60 shown in FIG. 2 can be realized in hardware or in a combination of hardware and software. In a case in which the image sensing apparatus 1 and the merging processing portion 60 are built with software, a block diagram showing the blocks realized with software serves as a functional block diagram of those blocks.

It should be understood that the embodiments of the present invention specifically described above are not meant to limit the present invention, and that many variations and modifications can be made within the spirit of the present invention.

The present invention relates to an image sensing apparatus that obtains an image by image sensing and applies electrical blur correction processing to the image, and an image sensing method of the image sensing apparatus. In particular, the present invention relates to an image sensing apparatus that performs correction by sensing a plurality of images and merging them together, and its image sensing method.

What is claimed is:

1. An image sensing apparatus, comprising:
  an image sensing portion that obtains an image by image sensing;
  a merging processing portion that produces a merged image by merging together first and second images obtained by the image sensing portion; and
  a control portion that controls image-sensing timing of the image sensing portion;
  wherein
  the control portion controls the image sensing portion such that an exposure time for the first image is shorter than exposure time for the second image, and such that the image sensing portion senses the second image after the first image,
  when the control portion detects an input of an instruction for image sensing into the image sensing apparatus, the control portion controls the image sensing portion such that image sensing of the first image is started immediately after a predetermined length of image-sensing standby time has elapsed, and
  the image-sensing standby time is zero when the exposure time for the first image is shorter than a predetermined threshold value.

2. The image sensing apparatus according to claim 1, wherein
  the image sensing standby time is set based on a structural feature of the image sensing apparatus, and the image-sensing standby time is a time from the input of an instruction for image sensing into the image sensing apparatus until start of a period during which magnitude of motion that the image sensing apparatus is caused to make is smaller than predetermined magnitude.

3. An image sensing method, comprising:
  a first image production step in which a first image is obtained by image sensing;
  a second image production step in which a second image is obtained by image sensing;
  a merging step in which a merged image is produced by merging together the first image obtained in the first image production step and the second image obtained in the second image production step;
  a detection step in which an input of an instruction to perform image sensing is detected; and
  a standby step for waiting for a predetermined length of image-sensing standby time to elapse after the detection step;
  wherein
  an exposure time for image sensing performed in the first image production step is shorter than an exposure time for image sensing in the second image production step,
  the first image production step is performed before the second image production step,
  the first image production step starts immediately after the standby step, and
  the image-sensing standby time is zero when the exposure time for the first image is shorter than a predetermined threshold value.

4. The image sensing method according to claim 3, wherein the image sensing standby time is set based on a structural feature of an image sensing apparatus which performs image sensing, and the image-sensing standby time is a time from the input of an instruction for image sensing into the image sensing apparatus until start of a period during which magnitude of motion that the image sensing apparatus is caused to make is smaller than predetermined magnitude.

* * * * *